United States Patent
Estevadeordal et al.

(10) Patent No.: US 9,599,514 B2
(45) Date of Patent: Mar. 21, 2017

(54) MULTI-COLOR PYROMETRY IMAGING SYSTEM AND METHOD OF OPERATING THE SAME

(71) Applicant: General Electric Company, Schenectady, NY (US)

(72) Inventors: Jordi Estevadeordal, Saratoga Springs, NY (US); Nirm Velumylum Nirmalan, Liberty Township, OH (US); Nilesh Tralshawala, Rexford, NY (US); Jeremy Clyde Bailey, Middle Grove, NY (US)

(73) Assignee: General Electric Company, Niskayuna, NY (US)

( * ) Notice: Subject to any disclaimer, the term of this patent is extended or adjusted under 35 U.S.C. 154(b) by 963 days.

(21) Appl. No.: 13/748,769

(22) Filed: Jan. 24, 2013

(65) Prior Publication Data
US 2014/0202130 A1    Jul. 24, 2014

(51) Int. Cl.
*F02C 3/00*    (2006.01)
*G01J 5/60*    (2006.01)
(Continued)

(52) U.S. Cl.
CPC ............ *G01J 5/602* (2013.01); *F02C 7/00* (2013.01); *G01J 5/0088* (2013.01);
(Continued)

(58) Field of Classification Search
CPC ......... F02C 7/00; G01J 5/0205; G01J 5/0862; G01J 5/0806; G01J 5/043; G01J 5/0865;
(Continued)

(56) References Cited

U.S. PATENT DOCUMENTS 4,708,474 A    11/1987    Suarez-Gonzalez
RE33,515 E *    1/1991    Fershko .................... A47F 1/12
                                          211/128.1
(Continued)

FOREIGN PATENT DOCUMENTS

WO    2010089627 A1    8/2010

OTHER PUBLICATIONS

Edge, Alison C., et al., "Surface Temperature-Field Imaging with Laser-Induced Thermographic Phosphorescence", Applied Optics, Optical Society of America, Feb. 1, 2000, pp. 546-553, vol. No. 39, Issue No. 4.
(Continued)

*Primary Examiner* — Charles Freay
(74) *Attorney, Agent, or Firm* — Pabitra K. Chakrabarti

(57) ABSTRACT

A multi-color pyrometry imaging system for a high-temperature asset includes at least one viewing port in optical communication with at least one high-temperature component of the high-temperature asset. The system also includes at least one camera device in optical communication with the at least one viewing port. The at least one camera device includes a camera enclosure and at least one camera aperture defined in the camera enclosure, The at least one camera aperture is in optical communication with the at least one viewing port. The at least one camera device also includes a multi-color filtering mechanism coupled to the enclosure. The multi-color filtering mechanism is configured to sequentially transmit photons within a first predetermined wavelength band and transmit photons within a second predetermined wavelength band that is different than the first predetermined wavelength band.

11 Claims, 11 Drawing Sheets

(51) Int. Cl.
*F02C 7/00* (2006.01)
*G01J 5/08* (2006.01)
*G01J 5/00* (2006.01)
*G01J 5/02* (2006.01)
*G01J 5/04* (2006.01)

(52) U.S. Cl.
CPC .............. *G01J 5/0205* (2013.01); *G01J 5/043* (2013.01); *G01J 5/0806* (2013.01); *G01J 5/0859* (2013.01); *G01J 5/0862* (2013.01); *G01J 5/0865* (2013.01); *G01J 2005/0077* (2013.01)

(58) Field of Classification Search
CPC ........ G01J 5/602; G01J 5/0088; G01J 5/0859; G01J 2005/0077
USPC ..... 374/120, 121, 130, 161, 162; 356/43, 44
See application file for complete search history.

(56) References Cited

U.S. PATENT DOCUMENTS

| | | | |
|---|---|---|---|
| 5,203,632 A | 4/1993 | Fisher et al. | |
| 5,265,036 A | 11/1993 | Suarez-Gonzalez et al. | |
| 5,822,222 A * | 10/1998 | Kaplinsky | G01J 5/60 250/316.1 |
| 6,682,216 B1 | 1/2004 | Small, IV et al. | |
| 6,816,803 B1 | 11/2004 | Palfenier et al. | |
| 7,633,066 B2 * | 12/2009 | Antel, Jr. | G01J 5/0022 250/339.02 |
| 7,907,178 B2 * | 3/2011 | Silverbrook | G03B 29/00 348/208.4 |
| 7,957,926 B2 | 6/2011 | Timans | |
| 8,508,606 B2 * | 8/2013 | Liu | G06T 5/003 348/208.4 |
| 2002/0035330 A1 * | 3/2002 | Cline | A61B 1/00009 600/476 |
| 2004/0227928 A1 * | 11/2004 | Bonne | G01J 5/60 356/43 |
| 2006/0202036 A1 * | 9/2006 | Wang | G06K 7/10722 235/462.07 |
| 2008/0020362 A1 * | 1/2008 | Cotin | G09B 23/285 434/267 |
| 2009/0285259 A1 | 11/2009 | Allen et al. | |
| 2010/0322492 A1 * | 12/2010 | Stepp | A61B 1/0638 382/128 |
| 2011/0119019 A1 | 5/2011 | Rogers et al. | |
| 2012/0153157 A1 | 6/2012 | Estevadeordal et al. | |
| 2015/0049786 A1 * | 2/2015 | Wang | G01M 15/14 374/138 |

OTHER PUBLICATIONS

EP Search Report and Written Opinion issued May 9, 2014 in connection with corresponding EP Patent Application No. 14152112.0.

Lemieux, Dennis H, On-Line Thermal Barrier Coating Monitoring for Real-Time Failure Protection and Life Maximization, Semi-Annual Report for the Period Oct. 2001 to Mar. 2002, 2002, 22 pages, U.S. Department of Energy, National Energy Technology Laboratory.

* cited by examiner

MULTI-COLOR PYROMETRY IMAGING SYSTEM AND METHOD OF OPERATING THE SAME

STATEMENT REGARDING FEDERALLY SPONSORED RESEARCH & DEVELOPMENT

This disclosure was made with Government support under contract number C391520602379X10A20 awarded by the Department of Energy. The Government may have certain rights in this invention.

BACKGROUND

The field of the disclosure relates generally to imaging systems and, more particularly, to multi-color pyrometry imaging systems used with combustion systems.

At least some known turbomachines, such as gas turbine engines, include a plurality of rotating turbine blades or buckets that channel high-temperature fluids through the gas turbine engines. Known turbine buckets are typically coupled to a wheel portion of a rotor within the gas turbine engine and cooperate with the rotor to form a turbine section. The turbine buckets are typically spaced circumferentially in a row extending about the rotor. Moreover, known turbine buckets are arranged in axially-spaced rows that are separated by a plurality of stationary nozzle segments that channel the fluid flowing through the engine towards each subsequent row of rotating buckets. Each row of nozzle segments, in conjunction with an associated row of turbine buckets, is usually referred to as a turbine stage and most known turbine engines include a plurality of turbine stages. The arrangement of turbine buckets and nozzle segments is referred to as a hot gas path.

Such known turbine buckets and nozzle segments in the hot gas path may wear over time. For example, such hot gas path components may exhibit stress-related cracking, such stresses induced by temperatures at or above predetermined parameters. Therefore, many known gas turbine engines include monitoring systems, e.g., temperature monitoring systems that provide operational temperature data in real time, i.e., at the time of measurement. At least some of these known temperature monitoring systems use optical instruments, e.g., optical pyrometers that generate a voltage output signal representative of the temperatures of the components being monitored. Also, many known gas turbines monitor and record such temperature data as an input to adjust operation, e.g., the firing rate of the gas turbine engine, i.e., the rate and/or ratio of fuel and air being combusted in the engine. In some cases, the temperature data may be used as an input into certain protective features of the engine.

In most known gas turbine engines, soot is a common byproduct of the combustion of hydrocarbon fuels and soot particles may become entrained in the hot gas being channeled through the hot gas path. Such soot particles may have temperatures greater than the components in the hot gas path. The soot particles can contact the optical pyrometers and induce a short burst of voltage signals having an elevated amplitude at the pyrometer output. Therefore, such high voltage signals may be misinterpreted as elevated component temperatures by the combustion control features programmed within the controllers. In addition, temperature reflections from surrounding hot surfaces and from the surfaces of turbine blades of interest, as a function of their emissivities, may generate higher than actual temperature indications. Many gas turbine engine controllers receive these signals a primary inputs into the associated combustion control features. Specifically, the rate and/or ratio of fuel and air being combusted in the engine may be adjusted due to the erroneous signals. Such conditions may result in an undesired reduction in power production by the turbine and oscillations of power production due to periodic and/or routine soot attachment to, and removal from, the optical pyrometer. Furthermore, the associated temperature indications may be used as an input to the protective features of the gas turbine engine, and an erroneous temperature indication may be significant enough to initiate an unplanned shutdown of the gas turbine engine, i.e., a unit trip.

BRIEF DESCRIPTION

In one aspect, a multi-color pyrometry imaging system for a high-temperature asset is provided. The system includes at least one viewing port in optical communication with at least one high-temperature component of the high-temperature asset. The system also includes at least one camera device in optical communication with the at least one viewing port. The at least one camera device includes a camera enclosure and at least one camera aperture defined in the camera enclosure. The at least one camera aperture is in optical communication with the at least one viewing port. The at least one camera device also includes a multi-color filtering mechanism coupled to the enclosure. The multi-color filtering mechanism is configured to sequentially transmit photons within a first predetermined wavelength band and transmit photons within a second predetermined wavelength band that is different than the first predetermined wavelength band In a further aspect, a method for operating a combustion system is provided. The method includes channeling a combustion gas stream through a hot gas path of the combustion system. The hot gas path includes at least one component. The method also includes channeling photons emitted from the at least one component to a camera aperture defined in at least one camera device through at least one viewing port. The method further includes sequentially transmitting photons within a first predetermined wavelength band and transmitting photons within a second predetermined wavelength band that is different than the first predetermined wavelength band. The method also includes generating an image of the at least one component.

In another aspect, a gas turbine engine is provided. The gas turbine engine includes at least one component positioned within a hot gas path defined within the gas turbine engine. The gas turbine engine also includes a multi-color pyrometry imaging system that includes at least one viewing port in optical communication with the at least one component. The gas turbine engine further includes at least one camera device in optical communication with the at least one viewing port. The at least one camera device includes a camera enclosure at least one camera aperture defined in the camera enclosure. The at least one camera aperture is in optical communication with the at least one viewing port. The at least one camera device also includes a multi-color filtering mechanism coupled to the enclosure. The multi-color filtering mechanism is configured to sequentially transmit photons within a first predetermined wavelength band and transmit photons within a second predetermined wavelength band that is different than the first predetermined wavelength band.

DRAWINGS

These and other features, aspects, and advantages of the present invention will become better understood when the following detailed description is read with reference to the accompanying drawings in which like characters represent like parts throughout the drawings, wherein.

Figure 1:
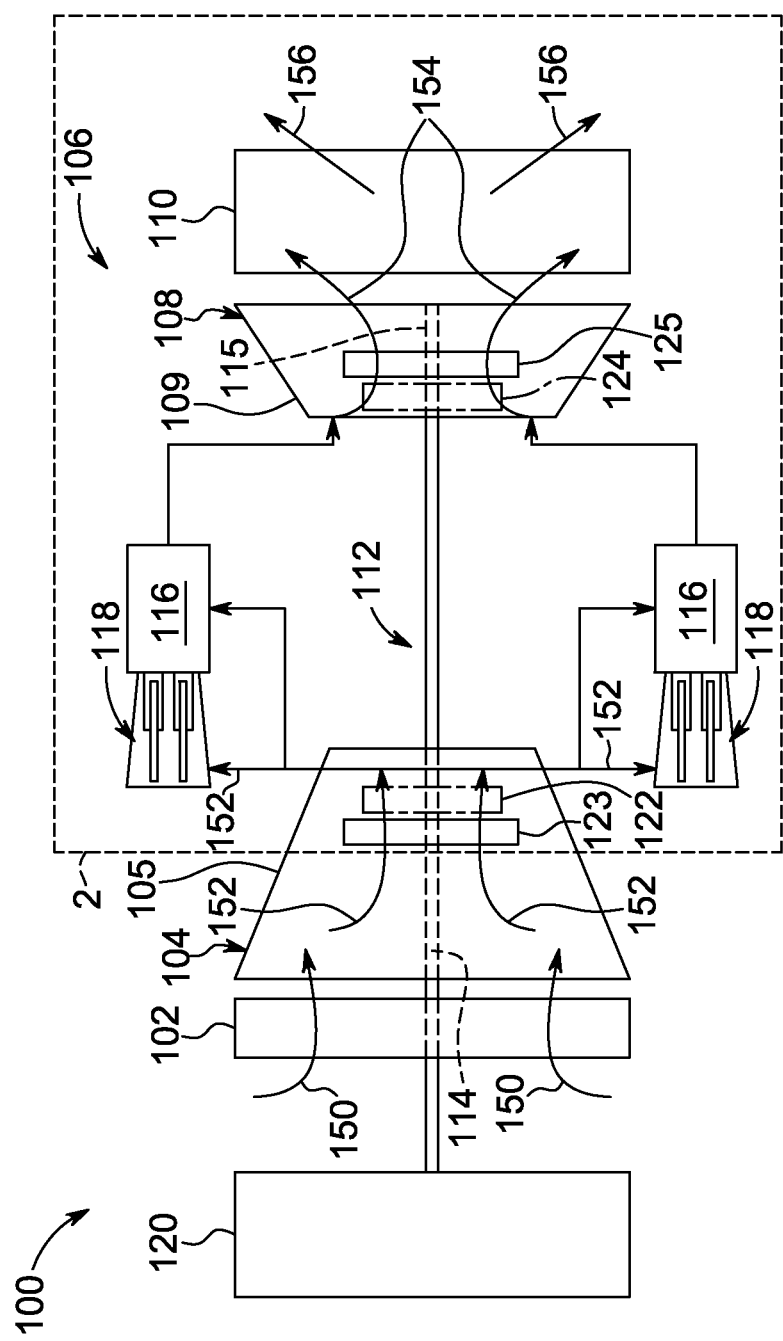
FIG. 1 is schematic diagram of an exemplary gas turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, and such ranges are identified and include all the sub-ranges contained therein unless context or language indicates otherwise.

The multi-color imaging systems as described herein provide a cost-effective method for increasing reliability and decreasing disruptions of operation of gas turbine engines and other high-temperature systems. Specifically, the multi-color imaging systems described herein generate a first image of a component from photons in a first wavelength range, generate a second image of the same component from photons in a second wavelength range, and combine the images to generate a quality image of the component that is not attained using the individual images by themselves. The multi-color imaging systems described herein operate within predetermined wavelength bands that have low absorptivity of hot gas constituents, such as water and carbon dioxide, and sufficient photon fluxes for photon intensity measurements. Also, the multi-color imaging systems described herein sequentially filter and transmit photons in the predetermined wavelength bands through a multi-filter color device. The multi-filter color devices described herein include translation mechanisms, electro-optic systems, and tunable filters. The translation mechanisms described herein physically and sequentially position color filters in front of a camera aperture to filter the photons to the desired wavelengths. The electro-optic systems regulate an electric field in the vicinity of color filters to sequentially change the wavelength filtering bands in real-time. The tunable filters are sequentially tuned in real-time to change the wavelength filtering bands.

FIG. 1 is a schematic view of a high-temperature asset, i.e., a turbomachine, and more specifically, in the exemplary embodiment, a gas turbine engine 100. Alternatively, any high-temperature apparatus, system, and facility may be monitored and/or controlled using a system substantially similar to the multi-color pyrometry imaging systems (none shown in FIG. 1) as described herein, including, without limitation, combustion systems such as fossil-fired furnaces, gasification systems, and the associated high-temperature exhaust systems.

In the exemplary embodiment, gas turbine engine 100 includes an air intake section 102, and a compressor section 104 that is coupled downstream from, and in flow communication with, intake section 102. Compressor section 104 is enclosed within a compressor casing 105. A combustor section 106 is coupled downstream from, and in flow communication with, compressor section 104, and a turbine section 108 is coupled downstream from, and in flow communication with, combustor section 106. Gas turbine engine 100 is enclosed within a turbine casing 109 and includes an exhaust section 110 that is downstream from turbine section 108. Moreover, in the exemplary embodiment, turbine section 108 is coupled to compressor section 104 via a rotor assembly 112 that includes, without limitation, a compressor rotor, or drive shaft 114 and a turbine rotor, or drive shaft 115.

In the exemplary embodiment, combustor section 106 includes a plurality of combustor assemblies, i.e., combustors 116 that are each coupled in flow communication with compressor section 104. Combustor section 106 also includes at least one fuel nozzle assembly 118. Each combustor 116 is in flow communication with at least one fuel nozzle assembly 118. Moreover, in the exemplary embodiment, turbine section 108 and compressor section 104 are rotatably coupled to a load 120 via drive shaft 114. For example, load 120 may include, without limitation, an electrical generator and/or a mechanical drive application, e.g., a pump. Alternatively, gas turbine engine 100 may be an aircraft engine. In the exemplary embodiment, compressor section 104 includes at least one compressor blade assembly 122, i.e., blade 122 and at least one adjacent stationary vane assembly 123.

Also, in the exemplary embodiment, turbine section 108 includes at least one turbine blade assembly, i.e., bucket 124 and at least one adjacent stationary nozzle assembly 125. Each compressor blade assembly 122 and each turbine bucket 124 is coupled to rotor assembly 112, or, more specifically, compressor drive shaft 114 and turbine drive shaft 115.

In operation, air intake section 102 channels air 150 towards compressor section 104. Compressor section 104 compresses inlet air 150 to higher pressures and temperatures prior to discharging compressed air 152 towards combustor section 106. Compressed air 152 is channeled to fuel nozzle assembly 118, mixed with fuel (not shown), and burned within each combustor 116 to generate combustion gases 154 that are channeled downstream towards turbine section 108. Combustion gases 154 generated within combustors 116 are channeled downstream towards turbine section 108. After impinging turbine bucket 124, thermal energy is converted to mechanical rotational energy that is used to drive rotor assembly 112. Turbine section 108 drives compressor section 104 and/or load 120 via drive shafts 114 and 115, and exhaust gases 156 are discharged through exhaust section 110 to ambient atmosphere.

Figure 2:
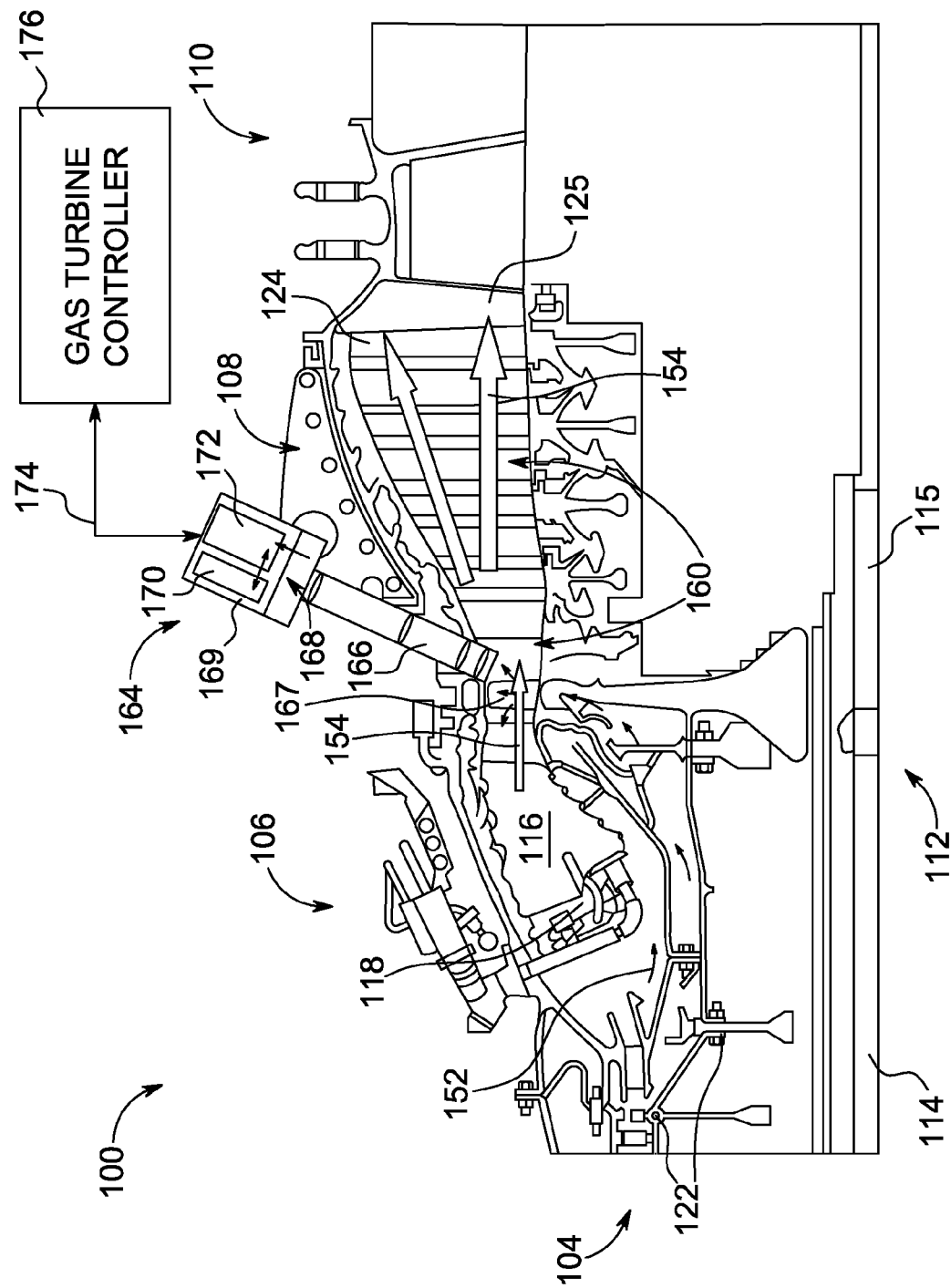
FIG. 2 is enlarged cross-sectional view of a portion of the gas turbine engine shown in FIG. 1 taken along area 2.

FIG. 2 is an enlarged cross-sectional view of a portion of gas turbine engine 100 taken along area 2 (shown in FIG. 1). Turbine section 108 includes a hot gas path 160 at least partially defined by turbine buckets 124. Turbine section 108 also includes a plurality of stationary blades, i.e., stationary nozzle assemblies 125 that further define hot gas path 160. Gas turbine engine 100 includes a multi-color pyrometry imaging system 164 that includes at least one viewing port 166 (only one shown) extending into a portion of hot gas path 160. In the exemplary embodiment, viewing port 166 is directed toward, and in optical communication with, a portion of hot gas path 160 defined by a first stage turbine bucket, i.e., a stage one bucket (S1B) 167 in the vicinity of the coupling of combustors 116 to turbine section 108. Alternatively, viewing port 166 is directed toward any portion of hot gas path 160 that enables operation of multi-color pyrometry imaging system 164 as described herein. Multi-color pyrometry imaging system 164 also includes a camera device 168 (discussed further below) in optical communication with viewing port 166.

Multi-color pyrometry imaging system 164 further includes a processing unit 169 coupled to camera device 168. Processing unit 169 includes at least one processor 170, a memory device 172 coupled to processor 170, and at least one input/output (I/O) conduit 174, wherein conduit 174 includes at least one I/O channel (not shown). In the exemplary embodiment, camera device 168 and processing unit 169 form an integrated, unitary "smart pyrometer architecture" that executes all algorithms and control logic and generates and transmits all data output that enables multi-color pyrometry imaging system 164 to operate as described herein. Alternatively, processing unit 169 may be a separate unit positioned remotely from camera device 168.

As used herein, the term processor is not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Processor 170 and other processors (not shown) as described herein process information transmitted from a plurality of electrical and electronic devices that include, without limitation, camera device 168. Memory devices 172 and storage devices (not shown) store and transfer information and instructions to be executed by processor 170. Memory devices 172 and the storage devices can also be used to store and provide temporary variables, static (i.e., non-volatile and non-changing) information and instructions, or other intermediate information to processor 170 during execution of instructions by processor 170. Instructions that are executed include, but are not limited to, analysis of signals transmitted from camera device 168. The execution of sequences of instructions is not limited to any specific combination of hardware circuitry and software instructions.

In the exemplary embodiment, gas turbine engine 100 includes a gas turbine controller 176 coupled to processing unit 169 through I/O conduit 174. In the exemplary embodiment, gas turbine controller 176 is fundamentally a standard package, such as, without limitation, a gas turbine digital engine control (GT DEC) system and/or a prognosis and health monitoring (PHM) system. Gas turbine controller 176 includes sufficient memory and processing resources to enable operation of gas turbine engine 100 as described herein, wherein such memory and processing resources are described above. Also, as described above, camera device 168 and processing unit 169 form an integrated, unitary architecture that executes all algorithms and control logic and generates and transmits all data output to gas turbine controller 176. Therefore, in the exemplary embodiment, only minor modifications to the architecture and programming of gas turbine controller 176 to accommodate processing unit 169 and data transmitted therefrom are necessary. Alternatively, gas turbine controller 176 may include the architecture and programming necessary to execute the functions of processing unit 169, thereby rendering processing unit 169 unnecessary.

Multi-color pyrometry imaging system 164 includes any number of view ports 166, camera devices 168, and processing units 169 that enables operation of gas turbine engine 100 as described here. Multi-color pyrometry imaging system 164 receives photons (not shown in FIG. 2) emitted from objects within its optical sensing range having wavelengths that are in a broad wavelength band that includes a range between, e.g., and without limitation, approximately 0.4 micrometers (µm) (400 nanometers (nm)) and approximately 10 µm (10,000 nm). Camera devices 168 are configured for the visible range, e.g., between approximately 0.6 µm (600 nm) and 0.7 µm (700 nm), and the near infrared range, e.g., between approximately 0.75 µm (750 nm) and approximately 3.0 µm (3000 nm).

Multi-color pyrometry imaging system 164 is configured to split a broad wavelength band radiation signal of a gas turbine hot gas path component into multiple narrow wavelength bands. Specifically, each camera device 168 includes a plurality of filtering devices (not shown in FIG. 2) each configured for a predetermined narrow wavelength band within the broad wavelength band defined above. For example, and without limitation, some embodiments of camera device 168 include at least one Indium Gallium Arsenide (InGaAs) filtering device configured for a wavelength band centered at approximately 1.25 µm (1,250 nm). Also, some embodiments of camera device 168 include at least one InGaAs filtering device configured for a wavelength band centered at approximately 1.6 µm (1,600 nm). Further, some embodiments of camera device 168 include at least one extended range InGaAs filtering device configured for a wavelength band centered at approximately 2.22 µm (2,220 nm). Moreover, some embodiments of camera device 168 include at least one InGaAs filtering device configured for a wavelength band centered at approximately 1.05 µm (1,050 nm). Also, some embodiment of camera device 168 include at least one silicon (Si) filtering device configured for a wavelength band centered at approximately 0.65 µm (650 nm). Any combinations of these five filtering devices that enable operation of multi-color pyrometry imaging system 164 as described herein is used.

Figure 3:
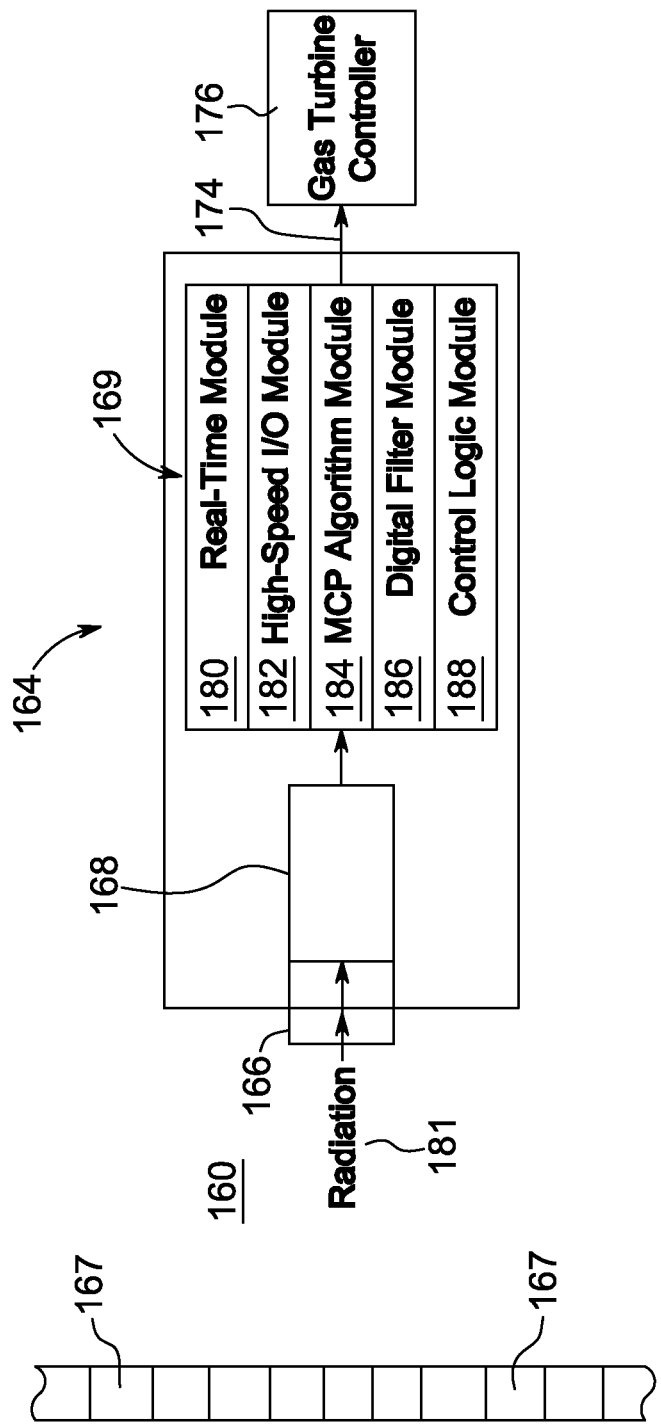
FIG. 3 is a schematic diagram of an exemplary architecture of a multi-color pyrometry imaging system that may be used with the gas turbine engine shown in FIGS. 1 and 2.

FIG. 3 is a schematic diagram of an exemplary architecture of multi-color pyrometry imaging system 164 that may be used with gas turbine engine 100 (shown in FIGS. 1 and 2). As described above, processing unit 169 includes processor 170 and memory device 172 (both shown in FIG. 2). In the exemplary embodiment, processing unit 169 of multi-color pyrometry imaging system 164 includes a real-time module 180 that includes sufficient system clocking hardware, software, and/or firmware to facilitate executing the programmed functionality of multi-color pyrometry imaging system 164 at predetermined processing speeds of at least one megaHertz (1 MHz). As used herein, the term "real-time" refers to high-speed processing of measurements of radiation 181 with negligible temporal latencies, i.e., substantially at the time of measurement. Also, as used herein, the term "high-speed" refers to processing frequencies of 1 MHz or greater. In the exemplary embodiment, processing unit 169 includes at least one high-speed I/O module 182 that includes a plurality of ports (not shown) coupled to a plurality of I/O channels (not shown) in I/O conduit 174. I/O module 182 facilitates high-speed transmission of temperature signal image signal inputs from camera device 168 and high-speed transmission of temperature signal and image signal outputs to gas turbine controller 176. Processing unit 169 further includes a multi-color pyrometry (MCP) algorithm module 184, a digital filter module 186, and a control logic module 188. Modules 180, 182, 184, 186, and 188 are communicatively coupled.

In operation, temperature measurements and images of S1B 167 generated within camera device 168 and processing unit 169 are transmitted to gas turbine controller 176 through I/O conduit 174. S1B 167 is typically the component in hot gas path 160 that will experience the highest temperatures because it is one of the first components to be exposed to exhaust gases 156 channeled from combustors 116. Therefore, gas turbine controller 176 includes sufficient programming to use temperature measurements of S1B 167 as one primary measurement of the operation of gas turbine engine 100. Moreover, gas turbine controller 176 includes sufficient programming to use temperature measurements of S1B 167 to control the firing rate, i.e., the rate and ratio of fuel and air combustion within combustors 116. Further, gas turbine controller 176 includes sufficient programming to use temperature measurements of S1B 167 to initiate protective functions within gas turbine engine 100 to reduce a potential for damage to gas turbine engine 100 in the event of a significant temperature excursion. Moreover, each of processing unit 169 and gas turbine controller 176 includes sufficient programming to generate images of each S1B 167 to an operator of gas turbine engine 100 as it rotates by viewing port 166.

Figure 4:
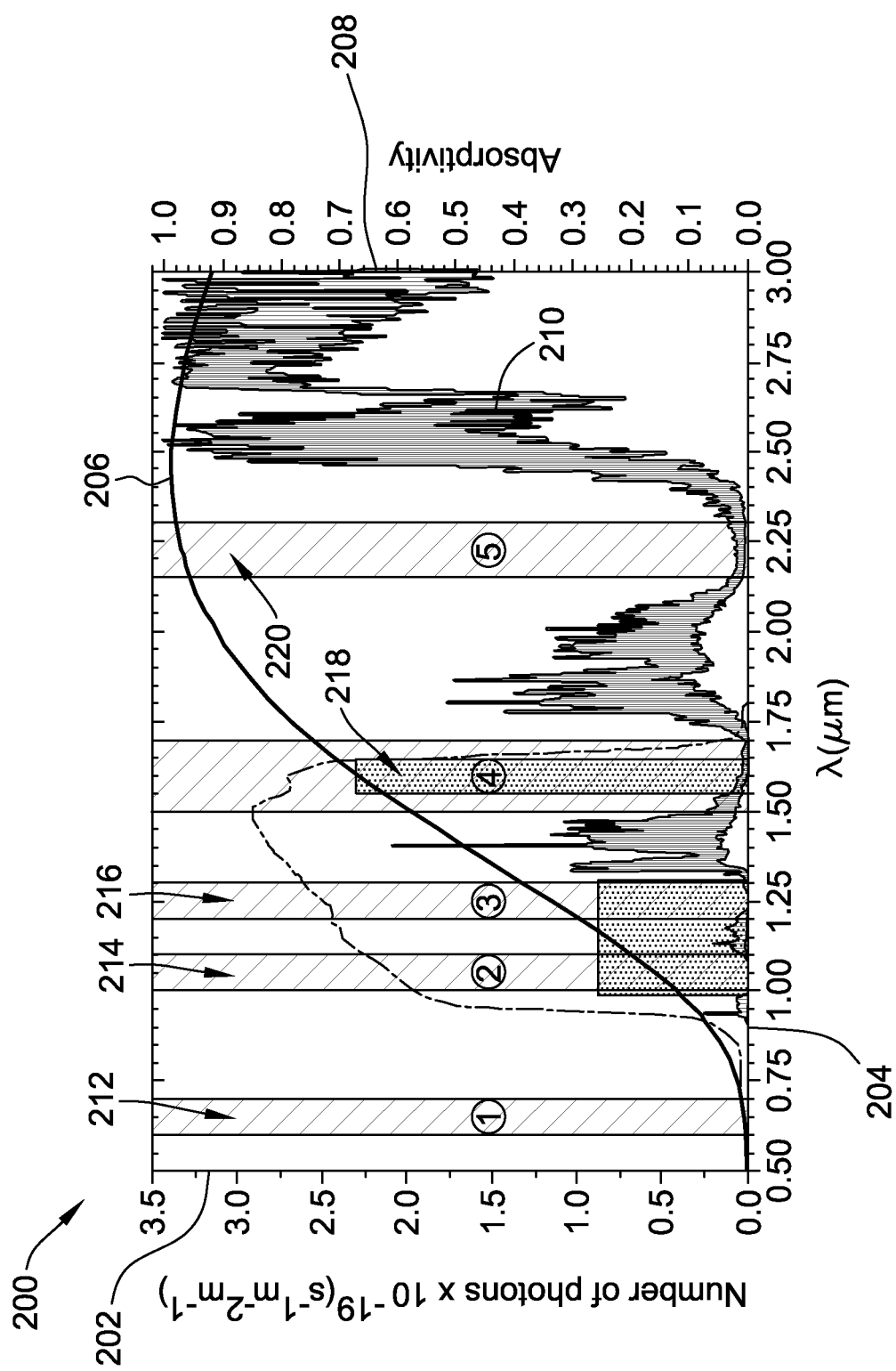
FIG. 4 is a graphical view of a plurality of color filtering wavelength bands that may be used with the multi-color pyrometry imaging system shown in FIGS. 2 and 3.

FIG. 4 is a graph 200 of a plurality of color filtering wavelength bands that may be used with the multi-color pyrometry imaging system 164 (shown in FIGS. 2 and 3). Graph 200 includes a left hand side (LHS) y-axis 202 representative of a value of blade radiation photonic flux emitted from S1B 167 (shown in FIGS. 1 and 3) calculated from Planck's Law using a temperature of approximately 1,500 degrees Kelvin (° K) (1,237 degrees Celsius (° C.) and 2,259 degrees Fahrenheit (° F.)) in units of $10^{-19}$ photons per cubic meter-seconds ($m^3$-sec) [photons/($m^3$-sec)]. LHS y-axis 202 is graduated in units of 0.5 photons/($m^3$-sec) from 0 to 3.5 photons/($m^3$-sec).

Graph 400 also includes an x-axis 204 representative of the wavelength ($\lambda$) spectrum extending from 0.5 µm (400 nm) to 3 µm (3,000 nm), graduated in increments of 0.05 µm. Graph 200 further includes a blade radiation flux curve 206, wherein the blade radiation photonic flux is distributed as a function of radiation wavelength ($\lambda$).

Graph 200 includes a right hand side (RHS) y-axis 208 representative of unitless absorptivity coefficients for general combustion products, within combustion gases 154 (shown in FIGS. 1 and 2) generated as a result of combustion of hydrocarbon fuels, e.g., water and carbon dioxide, under typical running conditions for gas turbine engine 100 (shown in FIGS. 1 and 2). RHS y-axis 208 is graduated in increments of 0.02 extending from 0.0 to 1.0. Graph 200 further includes an absorptivity coefficient curve 210, wherein the absorptivity is distributed as a function of radiation wavelength ($\lambda$).

Multi-color pyrometry imaging system 164 is configured to use the portions of the wavelength spectrum for those wavelength ranges having values associated with absorptivity coefficient curve 210 of approximately zero. Such low-absorptivity wavelength ranges are referred to as absorption-free detection windows. In the exemplary embodiment, five absorption/emission-free detection windows are available for use with multi-color pyrometry (MCP) measurements by multi-color pyrometry imaging system 164 as described herein. Specifically, a first color filtering wavelength band 212 extends from approximately 0.6 µm to approximately 0.7 µm, wherein silicon (Si) detectors are typically used. A second color filtering wavelength band 214 extends from approximately 1.0 µm to approximately 1.1 µm. A third color filtering wavelength band 216 extends from approximately 1.2 µm to approximately 1.3 µm. A fourth color filtering wavelength band 218 extends from approximately 1.55 µm to approximately 1.65 µm. InGaAs detectors are typically used for second, third, and fourth color filtering wavelength bands 214, 216, and 218, respectively. A fifth color filtering wavelength band 220 extends from approximately 2.15 μm to approximately 2.3 μm, wherein extended-InGaAs detectors are typically used.

Also, in general, temperature and imaging results improve with increased blade radiation received. Therefore, in some of the embodiments described herein, a combination of the five color filtering wavelength bands is used. Specifically, one embodiment uses third and fourth color filtering wavelength bands 216 and 220, respectively due to proximity to absorption-free detection windows, sufficient blade radiation transmission, and use of InGaAs technology. While specific wavelength bands are described for the exemplary embodiment, alternative embodiments may have different wavelength bands selected depending upon such factors as, without limitation, the type and quality of fuel being combusted, and thermodynamic conditions in the hot gas path, e.g., temperatures and pressures.

Figure 5:
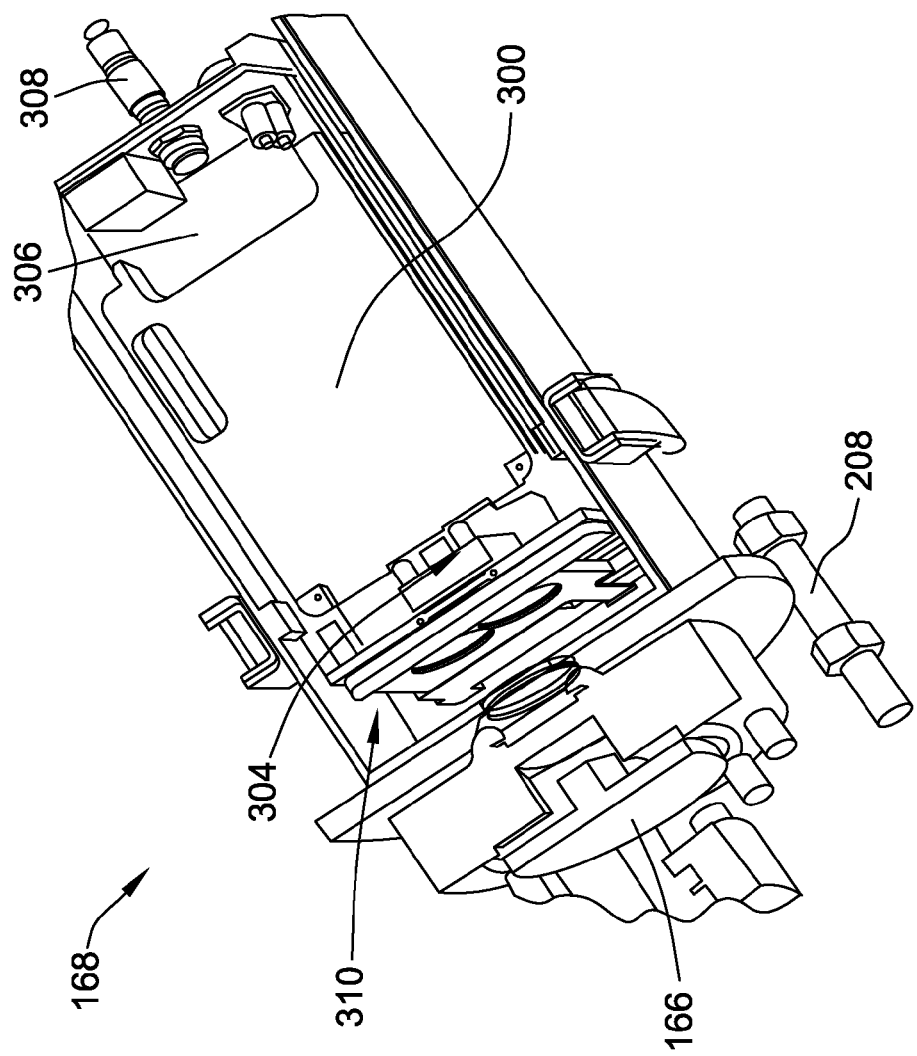
FIG. 5 is a schematic diagram of an exemplary camera device that may be used with the multi-color pyrometry imaging system shown in FIGS. 2 and 3.
Figure 6:
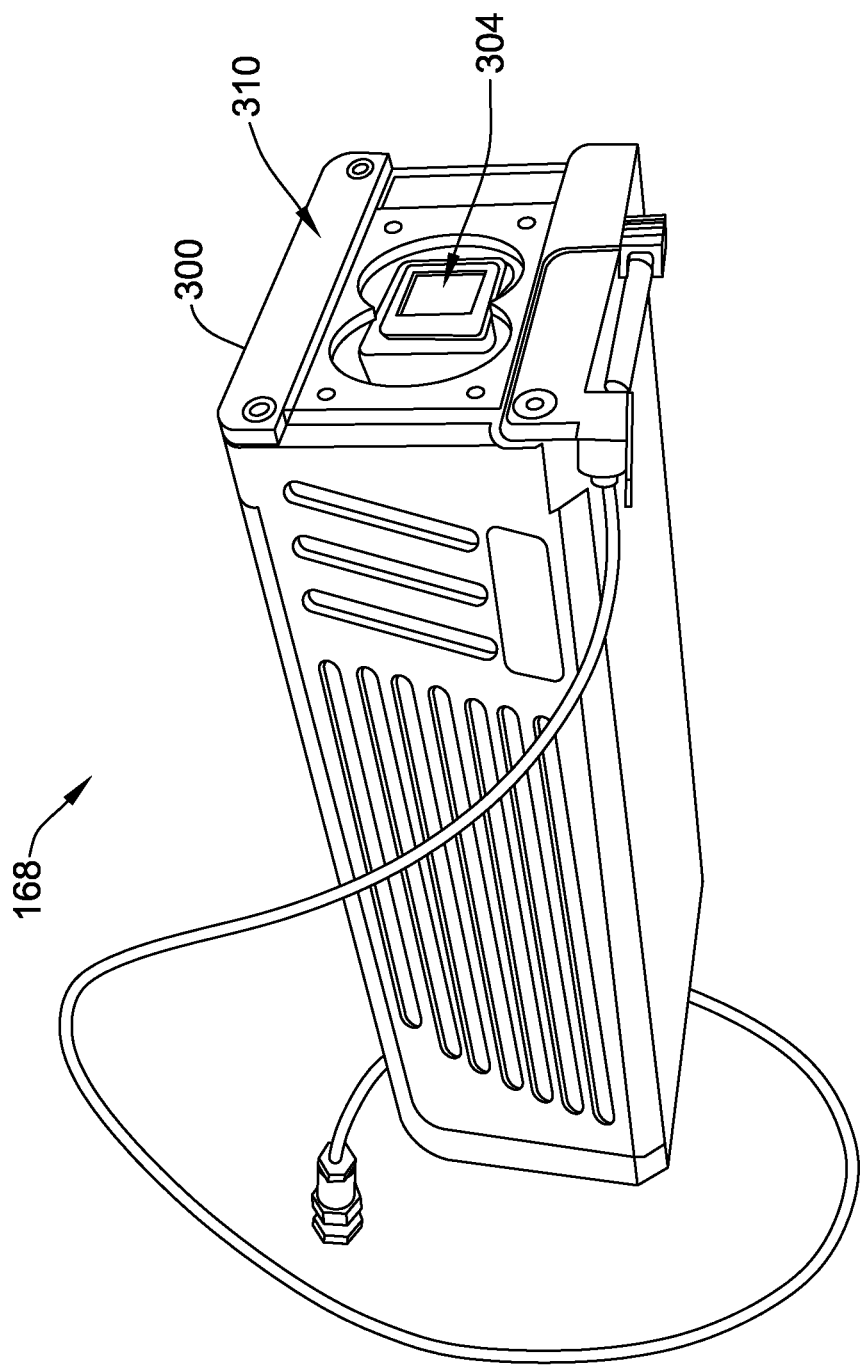
FIG. 6 is a perspective view of the camera device shown in FIG. 5.

FIG. 5 is a schematic diagram of exemplary camera device 168 that may be used with multi-color pyrometry imaging system 164 (shown in FIGS. 2 and 3). FIG. 6 is a perspective view of camera device 168. In the exemplary embodiment, camera device 168 includes a camera enclosure 300 that includes a coupling device 302 for coupling camera enclosure 300 to viewing port 166. Camera enclosure 300 defines a camera aperture 304 that is in optical communication with viewing port 166. Camera aperture 304 includes a sensor, e.g., without limitation, a focal plane array. Camera device 168 also includes a camera 306 that is coupled to processing unit 169 through a camera output channel 308. Camera device 168 further includes a multi-color filtering mechanism 310 positioned between viewing port 166 and camera aperture 304.

Figure 7:
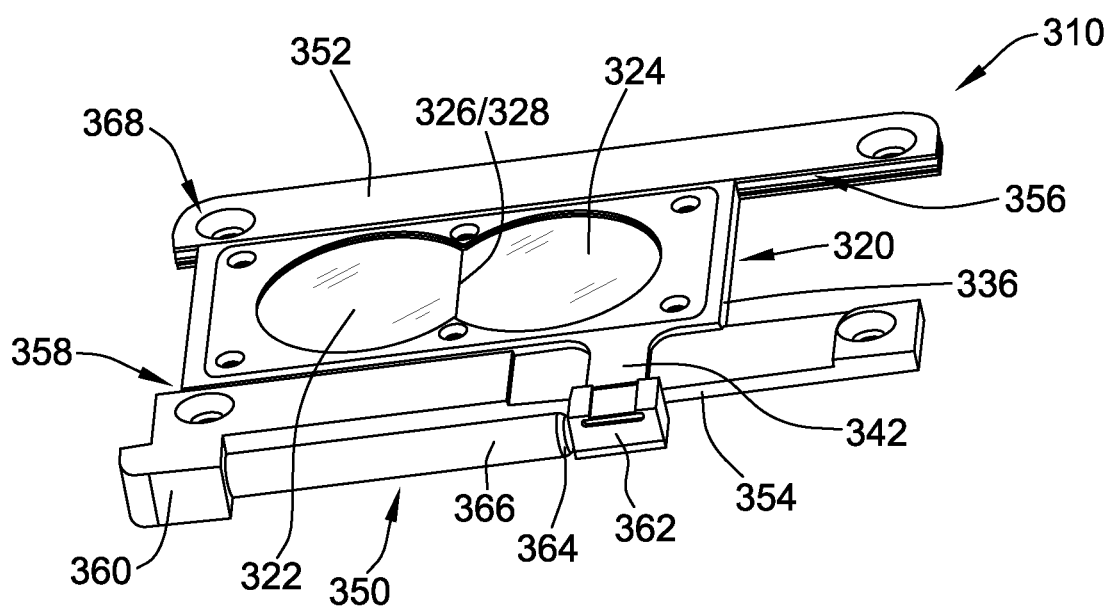
FIG. 7 is a perspective view of an exemplary multi-color filtering mechanism that may be used with the multi-color pyrometry imaging system shown in FIGS. 2 and 3.
Figure 8:
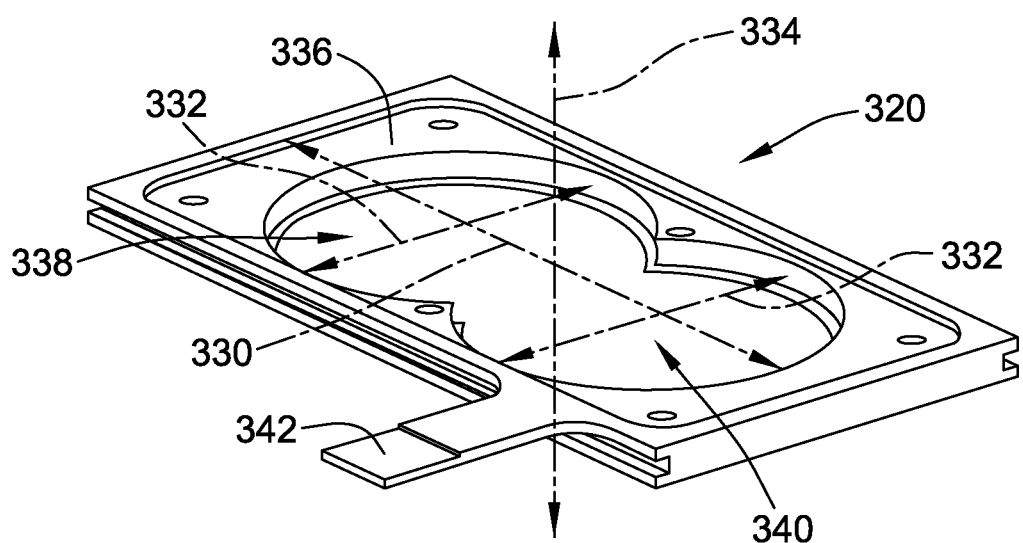
FIG. 8 is a perspective view of an exemplary color filter retainer that may be used with the multi-color filtering mechanism shown in FIG. 7.
Figure 9:
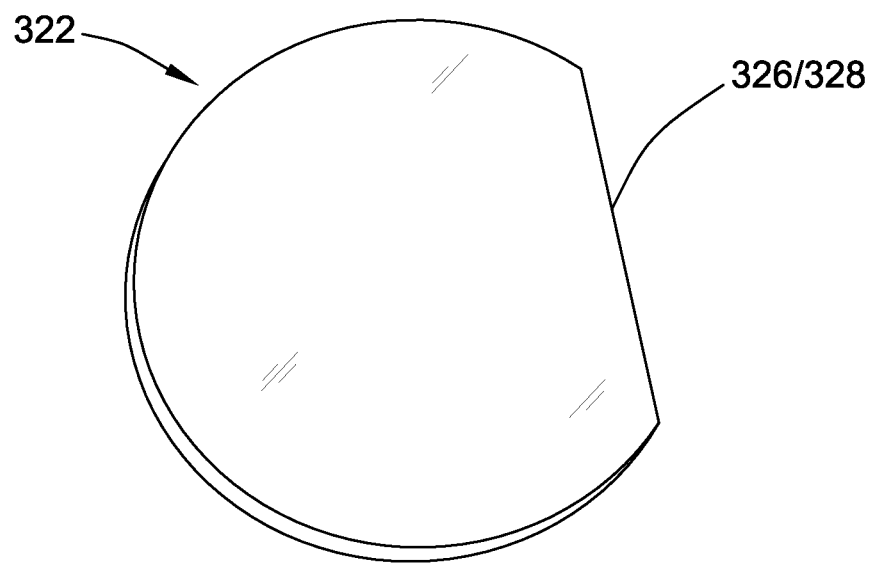
FIG. 9 is a perspective view of an exemplary color filter that may be used with the multi-color filtering mechanism shown in FIG. 7.
Figure 10:
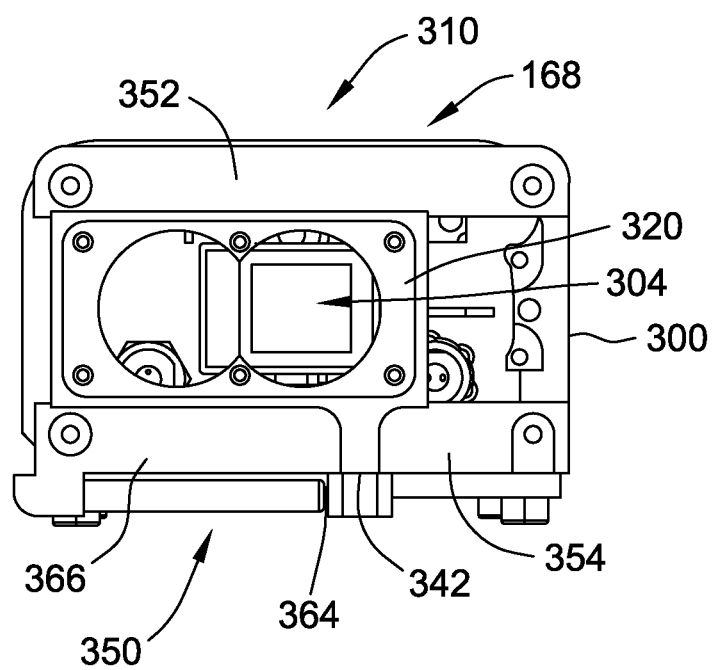
FIG. 10 is a frontal view of the multi-color filtering mechanism shown in FIG. 7 coupled to the camera device shown in FIGS. 5 and 6 with the color filters removed.

FIG. 7 is a perspective view of multi-color filtering mechanism 310 that may be used with multi-color pyrometry imaging system 164 (shown in FIGS. 2 and 3). FIG. 8 is a perspective view of an exemplary color filter retainer 320 that may be used with multi-color filtering mechanism 310 (shown in FIG. 7). FIG. 9 is a perspective view of an exemplary first color filter 322 that may be used with multi-color filtering mechanism 310 (shown in FIG. 7). FIG. 10 is a frontal view of multi-color filtering mechanism 310 coupled to camera enclosure 300 with color filters 322 and 324 removed.

In the exemplary embodiment, multi-color filtering mechanism 310 includes color filter retainer 320 that is configured to receive a left hand side (LHS) color filter 322 and a right hand side (RHS) color filter 324. Retainer 320 is configured for two color filters proximate each other. Alternatively, retainer 320 may be configured for any number of color filters that enables operation of multi-color filtering mechanism 310 as described herein. Also, LHS color filter 322 and RHS color filter 324 are substantially circular and symmetrical with adjacent mating surfaces 326 each defined by a chord 328. Alternatively, multi-color filtering mechanism 310 includes color filters that may be of any shape, including, without limitation, fully circular and rectangular. Further, LHS color filter 322 and RHS color filter 324 are positioned to be substantially coincident to a plane defined by an x-axis 330 and a y-axis 332 along a z-axis 334. Axes 330, 332, and 334 are orthogonal to each other. Alternatively, each of color filters 322 and 324 may be positioned along different points of z-axis 334 to accommodate differing focal characteristics of color filters 322 and 324.

Also, in the exemplary embodiment, retainer 320 includes a frame 336 that defines a LHS color filter cavity 338 and an adjacent RHS color filter cavity 340 configured to receive color filters 322 and 324, respectively. Frame 336 includes a translation tab 342 that facilitates translation of frame 336 along x-axis 330. Alternatively, translation tab 342 may be configured to facilitate translation of frame 336 along y-axis 332 and/or z-axis 334 (to adjust focal distance).

Further, in the exemplary embodiment, LHS color filter 322 is configured to filter radiation 181 (shown in FIG. 3) such that photons (not shown) are transmitted to the embedded sensor within camera aperture 304 (shown in FIGS. 5 and 6) within the first predetermined wavelength band within a range between approximately 1.20 μm and approximately 1.3 μm. Moreover, RHS color filter 324 is configured to filter radiation 181 (shown in FIG. 3) such that photons (not shown) are transmitted to the embedded sensor within camera aperture 304 within the second predetermined wavelength band within a range between approximately 1.55 μm and approximately 1.65 μm.

Moreover, in the exemplary embodiment, multi-color filtering mechanism 310 includes a translation mechanism 350. Translation tab 342 of color filter retainer 320 is associated with translation mechanism 350. Translation mechanism 350 includes an upper rail 352 and a substantially parallel lower rail 354 that define an upper groove 356 and a lower groove 358, respectively. Grooves 356 and 358 receive color filter retainer 320 and define sufficient clearance to facilitate lateral traversal of color filter retainer 320 along x-axis 330. Translation mechanism 350 also includes a LHS coupler 360 and a RHS coupler 362. Translation mechanism 350 further includes a piston rod 364 that is coupled to and extends between LHS coupler 360 and RHS coupler 362. Translation mechanism 350 also includes a piston 366 that is coupled to piston rod 364. Piston rod 364 defines a length that facilitates lateral traversal of piston 366 and piston rod 364 along x-axis 330. RHS coupler 362 also receives translation tab 342 of color filter retainer 320 such that lateral movement of piston 366 over piston rod 364 facilitates lateral movement of color filter retainer 320.

Translation mechanism 350 is one of a hydraulic actuator, a pneumatic actuator, and an electric actuator, e.g., a solenoid. The hydraulic fluid, air, and electricity may be provided from the existing services associated with gas turbine engine 100 (shown in FIG. 1). The commands for operation of translation mechanism 350 may be transmitted from one of processing unit 169 and gas turbine controller 176 or any other source that enable operation of multi-color pyrometry imaging system 164 as described herein. Translation mechanism 350 is coupled to camera enclosure 300 through a plurality of fasteners (not shown) inserted through a fastener aperture 368 (only one labeled in FIG. 7) defined in upper rail 352 and lower rail 354.

Figure 11:
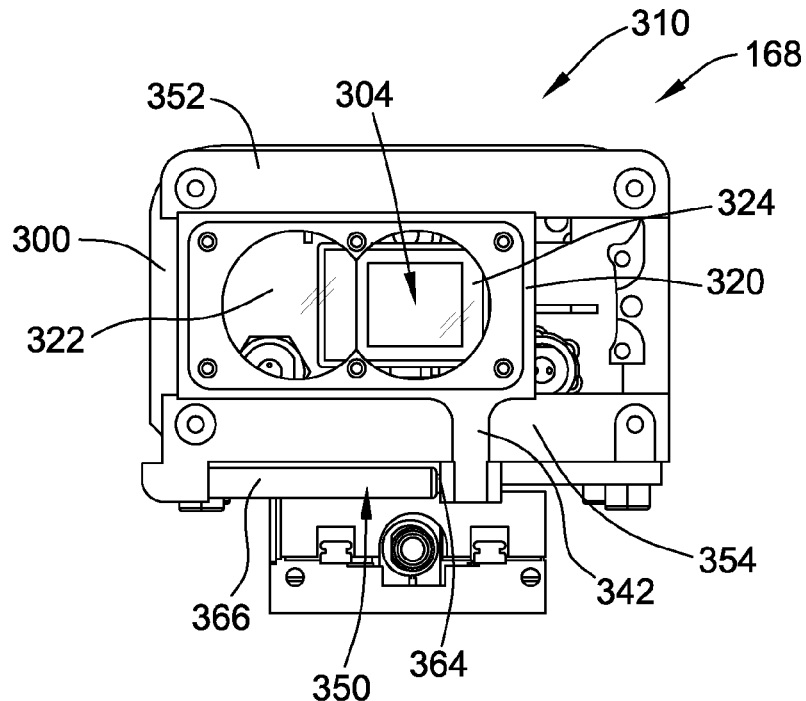
FIG. 11 is a frontal view of the multi-color filtering mechanism shown in FIG. 7 coupled to the camera device shown in FIGS. 5 and 6 with the color filters installed and the multi-color filtering mechanism in a first position.
Figure 12:
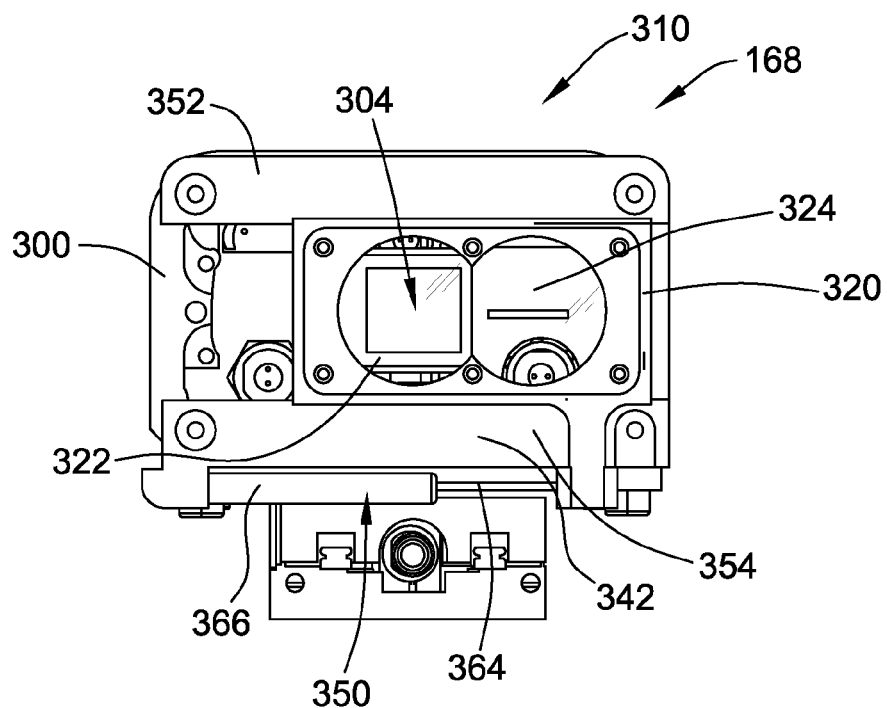
FIG. 12 is a frontal view of the multi-color filtering mechanism shown in FIG. 11 in a second position.
Figure 13:
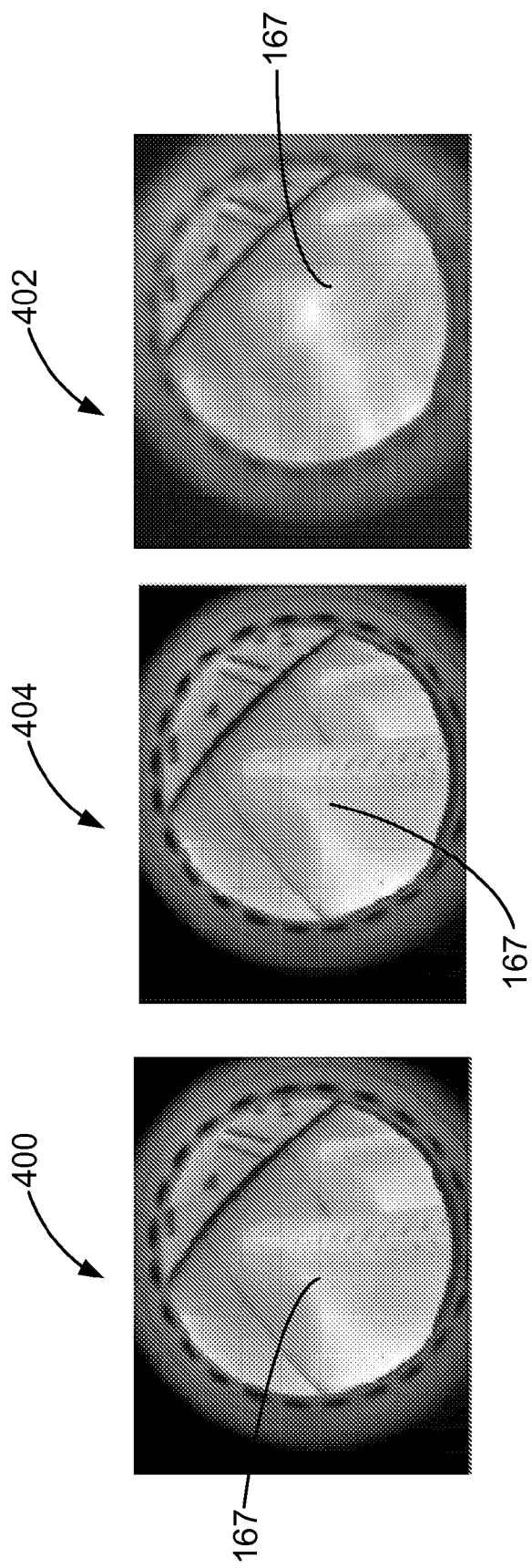
FIG. 13 is a plurality of exemplary images generated by the multi-color pyrometry imaging system shown in FIGS. 2 and 3.

FIG. 11 is a frontal view of multi-color filtering mechanism 310 coupled to camera enclosure 300 in a first position. FIG. 12 is a frontal view of multi-color filtering mechanism 310 in a second position. FIG. 13 is a plurality of exemplary images generated by multi-color pyrometry imaging system 164 (shown in FIGS. 2 and 3).

In operation, photons in radiation 181 (shown in FIG. 3) are transmitted through viewing port 166 (shown in FIGS. 2, 3, and 5) to camera device 168. Many of the photons (not shown) are in the broad wavelength band that includes a range between, e.g., and without limitation, approximately 0.4 μm and approximately 10 μm. Color filter retainer 320 is positioned to the left such that RHS color filter 324 is positioned between, and in optical communication with, viewing port 166 and camera aperture 304. The broad stream of photons is filtered to the second wavelength band within a range between approximately 1.55 μm and approximately 1.65 μm. The filtered flux of photons is transmitted through camera aperture 304 to camera 306. Camera 306 generates and transmits a signal stream representative of the photons in the second range to processing unit 169 (shown in FIGS. 2 and 3). Processing unit 169 generates first image 400 of one predetermined S1B 167.

Also, in operation, sequentially, translation mechanism 350 is operated to translate color filter retainer 320 to the right such that LHS color filter 322 is positioned between, and in optical communication with, viewing port 166 and camera aperture 304. The broad stream of photons is filtered to the first wavelength band within a range between approximately 1.2 μm and approximately 1.3 μm. The filtered flux of photons is transmitted through camera aperture 304 to camera 306. Camera 306 generates and transmits a signal stream representative of the photons in the first range to processing unit 169. Processing unit 169 generates second image 402 of the predetermined S1B 167.

The exposure time for first image 400 and second image 402 is any value that enables operation of by multi-color pyrometry imaging system 164 as described herein, e.g., without limitation, values within a range between approximately 1 microsecond (μsec) and 100 μsec.

Further, in operation, processing unit 169 executes the algorithms and instructions necessary to generate combined image 404. Processing unit 169 performs optical corrections to account for contributions to radiation 181 that may originate from those areas in hot gas path 160 that are out of focus with respect to color filters 322 and/or 324. Also, processing unit 169 performs correction modeling for color filters 322 and 324 to correct for potential characteristics of color filters 322 and 324, e.g., without limitation, low power and low focal length.

Moreover, in operation, to generate combined image 404, processing unit 169 uses multi-color algorithms to acquire the raw colors through color filters 322 and 324 sequentially as described above. Processing unit 169 uses black body calibration data that facilitates determining radiance temperature values for the associated colors. Further, processing unit 169 converts the measured photon intensity values to radiance temperature values for each measured color and calculates the single color temperatures for facilitating comparison.

In the exemplary embodiment, emissivity values associated with blade surface emissivities of S1B 167 and temperature reflections from surrounding hot surfaces in hot gas path 160 (shown in FIGS. 2 and 3) are assumed. As used herein, the emissivity (ε) of a material is the relative ability of its surface to emit energy by radiation. It is the ratio of energy radiated by a particular material to energy radiated by a black body at the same temperature. For example, a true black body would have an ε=1 while any real object would have an ε<1. Emissivity is a dimensionless quantity. In general, the duller and blacker a material is, the closer its emissivity is to 1, and the more reflective a material is, the lower its emissivity. Alternatively, emissivity values may be determined in real-time.

Also, in operation, image registration is executed to generate combined image 404. Such image registration facilitates matching the various color images, e.g., images 400 and 402, to compensate for different magnifications and jitter. In addition, processing unit 169 may execute accumulation algorithms to add additional frames to first image 400 and/or second image 402 to increase the signals associated with images 400 and 402. Also, processing unit 169 may use deblurring algorithms, contrasting algorithms, and averaging algorithms to generate combined image 404.

As described above, the exemplary embodiment includes color filter 324 to generate first image 400 by filtering photons to a wavelength band within a range between approximately 1.55 μm and approximately 1.65 μm. Also, color filter 322 generates second image 402 by filtering photons to a wavelength band within a range between approximately 1.20 μm and approximately 1.3 μm. However, as described above, other color filters may be used. Such alternative color filters filter photons to wavelength bands that include wavelength bands within a range between approximately 0.60 micrometers (μm) and approximately 0.7 μm, between approximately 1.0 μm and approximately 1.1 μm, and between approximately 2.15 μm and approximately 2.3 μm.

Further, a plurality of multi-color pyrometry imaging systems 164 may be positioned about gas turbine engine 100. In such alternative configurations, a plurality of camera devices 168 are employed such that one of alternative camera devices 168 includes a first single color filter to transmit photons in a first predetermined wavelength band selected from the five bands above and another alternative camera device 168 includes a second single color filter to transmit photons in a second predetermined wavelength band selected from the five bands above. Additional alternative configurations include a plurality of alternative camera devices 168, each with a plurality of color filters with any combinations of wavelength bands that enables operation of multi-color pyrometry imaging system 164 as described herein.

Moreover, multi-color pyrometry imaging systems 164 include sufficient programming to facilitate visual observation of each S1B 167 in a predetermined sequence while S1Bs 167 are rotating at high velocities. Such programming includes sufficient algorithms to facilitate sequential image capture of a single S1B 167 as it rotates. Such programming may use exiting keyphasor information. As used herein, the term "keyphasor" is used to represent an electric pulse, or trigger, which is derived from a point (not shown) on rotating shaft 115 (shown in FIGS. 1 and 2). As the point rotates past a stationary device (not shown) in turbine section 108 (shown in FIGS. 1 and 2), a trigger signal (not shown) is transmitted such that the frequency of the keyphasor trigger signal is equivalent to a rotational frequency of S1B 167, i.e., the speed of shaft 115.

Figure 14:
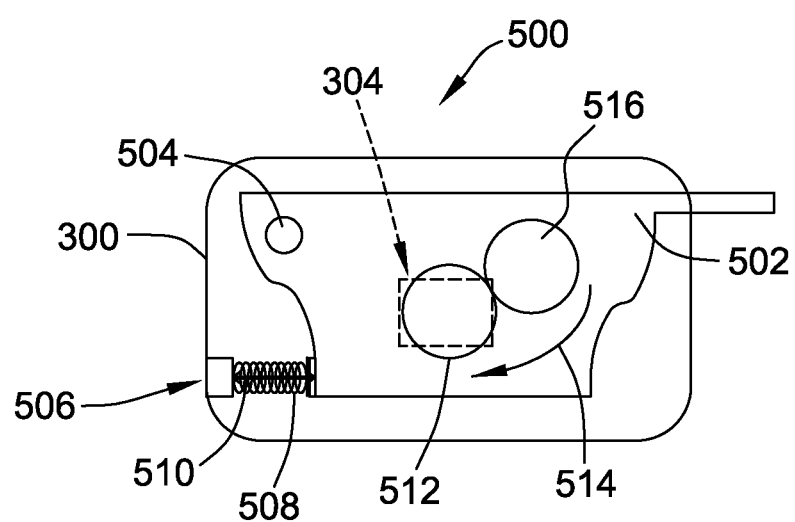
FIG. 14 is an alternative exemplary multi-color filtering mechanism that may be coupled to the camera device shown in FIGS. 5 and 6.

FIG. 14 is an alternative exemplary multi-color filtering mechanism 500 that may be coupled to camera enclosure 300 that defines camera aperture 304. Multi-color filtering mechanism 500 includes an alternative color filter retainer 502 that is hingedly coupled to camera enclosure 300 through a pivot device 504. Multi-color filtering mechanism 500 also includes a spring-type translation device 506 including a spring 508 and rod 510, both coupled to color filter retainer 502. Translation device 506 is biased to maintain a first color filter 512 over camera aperture 304. Translation device 506 is activated through of one hydraulic, pneumatic, and electric (solenoid) power to pull rod 510 to the left to overcome the bias of spring 508 and rotationally translate color filter retainer 502 in the direction of arrow 514 such that a second color filter 516 is positioned over camera aperture 304. Once rod 510 is relaxed, the bias of spring 508 repositions color filter retainer 502 such that first color filter 512 is repositioned over camera aperture 304.

Other alternative embodiments of the multi-color filtering mechanisms described herein may include electro-optics devices that alter the optical properties of the associated color filters by regulating an electric field induced in the vicinity of the color filters 322, 324, 510, and 514. Also, other alternative embodiments of the multi-color filtering mechanisms described herein may include a tunable filter coupled to, or rather than, color filters 322, 324, 510, and 514 such that the photons transmitted through camera aperture 304 are within the predetermined wavelength bands. Both the electro-optics devices and the tunable filters may be controlled through processing units 169 in real-time to sequentially filter the photons to the desired wavelength bands.

The above-described multi-color imaging system provides a cost-effective method for increasing reliability and decreasing disruptions of operation of gas turbine engines and other high-temperature systems. Specifically, the devices, systems, and methods described herein generate a first image of a component from photons in a first wavelength range, generate a second image of the same component from photons in a second wavelength range, and combine the images to generate a quality image of the component that is not attained using the individual images by themselves. The devices, systems, and methods described herein operate within predetermined wavelength bands that have low absorptivity of hot gas constituents, such as water and carbon dioxide, and sufficient photon fluxes for photon intensity measurements. Also, the devices, systems, and methods described herein sequentially filter and transmit photons in the predetermined wavelength bands through a multi-filter color device. The multi-filter color devices described herein include translation mechanisms, electro-optic systems, and tunable filters. The translation mechanisms described herein physically and sequentially position color filters in front of a camera aperture to filter the photons to the desired wavelengths. The electro-optic systems regulate an electric field in the vicinity of color filters to sequentially change the wavelength filtering bands in real-time. The tunable filters are sequentially tuned in real-time to change the wavelength filtering bands. Improving the monitoring of hot gas components with clear visual images in real-time facilitate earlier detection of physical deformation such that remedial action may be planned for. Also, providing an indication of no physical deformations of the components being monitors facilitate deferring maintenance outages. Both early detection and deferred action facilitate cost savings in the operation and maintenance of gas turbine engines.

An exemplary technical effect of the methods, systems, and apparatus described herein includes at least one of (a) generating a combined image of hot gas path components from multiple images generated from photons collected from narrow wavelength bands; (b) facilitating a reduction in firing rate oscillations induced by inaccurate component temperature monitoring; and (c) facilitating a reduction in automatic protective actions induced by inaccurate component temperature monitoring.

Exemplary embodiments of multi-color imaging systems for gas turbine engines and methods for operating are described above in detail. The multi-color imaging systems and methods of operating such systems are not limited to the specific embodiments described herein, but rather, components of systems and/or steps of the methods may be utilized independently and separately from other components and/or steps described herein. For example, the methods may also be used in combination with other high temperature combustion systems and methods, and are not limited to practice with only the gas turbine systems and multi-color imaging systems and methods as described herein. Rather, the exemplary embodiment can be implemented and utilized in connection with many other high temperature combustion applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A multi-color pyrometry imaging system for a high-temperature asset comprising:
at least one viewing port in optical communication with at least one component of the high-temperature asset;
at least one camera device in optical communication with said at least one viewing port, wherein said at least one camera device comprises:
a camera enclosure;
at least one camera aperture defined in said camera enclosure, wherein said at least one camera aperture is in optical communication with said at least one viewing port; and
a multi-color filtering mechanism coupled to said enclosure, said multi-color filtering mechanism configured to sequentially transmit photons within a first predetermined wavelength band and transmit photons within a second predetermined wavelength band that is different than the first predetermined wavelength band, said multi-color filtering mechanism comprising:
a first color filter configured to transmit photons within the first predetermined wavelength band;
a second color filter configured to transmit photons within the second predetermined wavelength band;
a retainer configured to receive said first color filter and said second color filter; and
a translation mechanism coupled to said retainer, said translation mechanism configured to sequentially position each of said first color filter and said second color filter in optical communication with said at least one camera aperture and said at least one viewing port;
wherein said first color filter and said second color filter at least partially define a plurality of color filters, wherein each of said color filters are formed into predetermined shapes and are positioned proximate each other within said retainer; and
further wherein said retainer is coupled to said camera enclosure such that said retainer facilitates at least one of substantially linear translation and substantially rotational translation of said multi-color filtering mechanism; and at least one processor coupled to said at least one camera device, said at least one processor programmed to:
receive a first stream of signals generated in said at least one camera device substantially representative of the photons within the first predetermined wavelength band;
receive a second stream of signals generated in said at least one camera device substantially representative of the photons within the second predetermined wavelength band; and
generate a combined image of the at least one component using at least one multi-color algorithm and acquiring the first signal stream representative of the photons transmitted through the first color filter and within the first predetermined wavelength band, and the second signal stream representative of the photons transmitted through the second color filter and within the second predetermined wavelength band.

2. The system in accordance with claim 1, wherein said translation mechanism comprises at least one of:
a hydraulic actuator;
a pneumatic actuator; and
an electric actuator.

3. The system in accordance with claim 1, wherein said multi-color filtering mechanism comprises one of an electro-optic system and a tunable filter.

4. The system in accordance with claim 1, wherein the first predetermined wavelength band and the second predetermined wavelength band at least partially define a plurality of predetermined wavelength bands including:
a wavelength band within a range between approximately 0.60 micrometers ($\mu$m) and approximately 0.7 $\mu$m;
a wavelength band within a range between approximately 1.0 $\mu$m and approximately 1.1 $\mu$m;
a wavelength band within a range between approximately 1.20 $\mu$m and approximately 1.3 $\mu$m;
a wavelength band within a range between approximately 1.55 $\mu$m and approximately 1.65 $\mu$m; and
a wavelength band within a range between approximately 2.15 $\mu$m and approximately 2.3 $\mu$m.

5. The system in accordance with claim 4, wherein said at least one camera device comprises a plurality of camera devices comprising:
a first camera device comprising said first color filter configured to transmit photons within the first predetermined wavelength band; and
a second camera device comprising said second color filter configured to transmit photons within the second predetermined wavelength band.

6. The system in accordance with claim 1, wherein the high-temperature asset is a gas turbine engine defining a hot gas path and the high-temperature component is a hot gas path component.

7. A method for operating a combustion system, said method comprising:
channeling a combustion gas stream through a hot gas path of the combustion system, the hot gas path includes at least one component;
channeling photons emitted from the at least one component to a camera aperture defined in at least one camera device through at least one viewing port;
sequentially transmitting photons within a first predetermined wavelength band and transmitting photons within a second predetermined wavelength band that is different than the first predetermined wavelength band, wherein sequentially transmitting photons comprises operating a multi-color filtering mechanism in optical communication with the camera aperture comprising:
positioning a first color filter of the multi-color filtering mechanism and filtering the photons such that a substantial portion of the photons transmitted through the first color filter into the camera aperture are within the first predetermined wavelength band; and
positioning a second color filter of the multi-color filtering mechanism and filtering the photons such that a substantial portion of the photons transmitted through the second color filter into the camera aperture are within the second predetermined wavelength band;
wherein positioning the first color filter and positioning the second color filter further comprises operating a translation mechanism including at least one of a hydraulic actuator, a pneumatic actuator, and an electric actuator;
wherein the first color filter and the second color filter are positioned within a retainer such the first color filter and the second color filter at least partially define a plurality of color filters, wherein each of said color filters are formed into predetermined shapes and are positioned proximate each other within said retained, wherein positioning the first color filter and positioning the second color filter comprises at least one of:
substantially linearly translating the retainer linearly with respect to the camera aperture using the translation mechanism; and
substantially rotationally translating the retainer with respect to the camera aperture using the translation mechanism; and
generating a combined image of the at least one component using at least one multi-color algorithm and acquiring a first signal stream representative of the photons transmitted through the first color filter and within the first predetermined wavelength band, and a second signal stream representative of the photons transmitted through the second color filter and within the second predetermined wavelength band.

8. The method in accordance with claim 7, wherein the first predetermined wavelength band and the second predetermined wavelength band at least partially define a plurality of predetermined wavelength bands, wherein sequentially transmitting photons comprises at least two of:
filtering the photons such that a substantial portion of the photons transmitted to the camera aperture includes photons within a wavelength band in a range between approximately 0.60 micrometers ($\mu$m) and approximately 0.7 $\mu$m;
filtering the photons such that a substantial portion of the photons transmitted to the camera aperture includes photons within a wavelength band within a range between approximately 1.0 $\mu$m and approximately 1.1 $\mu$m;
filtering the photons such that a substantial portion of the photons transmitted to the camera aperture includes photons within a wavelength band within a range between approximately 1.20 $\mu$m and approximately 1.3 $\mu$m;
filtering the photons such that a substantial portion of the photons transmitted to the camera aperture includes photons within a wavelength band within a range between approximately 1.55 $\mu$m and approximately 1.65 $\mu$m; and
filtering the photons such that a substantial portion of the photons transmitted to the camera aperture includes photons within a wavelength band within a range between approximately 2.15 µm and approximately 2.3 µm.

9. A gas turbine engine comprising:
at least one component positioned within a hot gas path defined within said gas turbine engine; and
a multi-color pyrometry imaging system comprising:
  at least one viewing port in optical communication with said at least one component;
  at least one camera device in optical communication with said at least one viewing port, wherein said at least one camera device comprises:
    a camera enclosure;
    at least one camera aperture defined in said camera enclosure, wherein said at least one camera aperture is in optical communication with said at least one viewing port;
    a multi-color filtering mechanism coupled to said enclosure, said multi-color filtering mechanism configured to sequentially transmit photons within a first predetermined wavelength band and transmit photons within a second predetermined wavelength band that is different than the first predetermined wavelength band, said multi-color filtering mechanism comprises:
      a first color filter configured to transmit photons within the first predetermined wavelength band;
      a second color filter configured to transmit photons within the second predetermined wavelength band;
      a retainer configured to receive said first color filter and said second color filter; and
      a translation mechanism coupled to said retainer, said translation mechanism configured to sequentially position each of said first color filter and said second color filter in optical communication with said at least one camera aperture and said at least one viewing port,
      wherein said first color filter and said second color filter at least partially define a plurality of color filters, wherein each of said color filters are formed into predetermined shapes and are positioned proximate each other within said retainer; and
    further wherein said retainer is coupled to said camera enclosure such that said retainer facilitates at least one of substantially linear translation and substantially rotational translation of said multi-color filtering mechanism; and
  at least one processor coupled to said at least one camera device, said at least one processor programmed to:
    receive a first stream of signals generated in said at least one camera device substantially representative of the photons within the first predetermined wavelength band;
    receive a second stream of signals generated in said at least one camera device substantially representative of the photons within the second predetermined wavelength band; and
    generate a combined image of the at least one component using at least one multi-color algorithm and acquiring the first signal stream representative of the photons transmitted through the first color filter and within the first predetermined wavelength band, and the second signal stream representative of the photons transmitted through the second color filter and within the second predetermined wavelength band.

10. The gas turbine engine in accordance with claim 9, wherein said translation mechanism comprises at least one of a hydraulic actuator, a pneumatic actuator, and an electric actuator.

11. The system in accordance with claim 9, wherein the first predetermined wavelength band and the second predetermined wavelength band at least partially define a plurality of predetermined wavelength bands including:
  a wavelength band within a range between approximately 0.60 micrometers (µm) and approximately 0.7 µm;
  a wavelength band within a range between approximately 1.0 µm and approximately 1.1 µm;
  a wavelength band within a range between approximately 1.20 µm and approximately 1.3 µm;
  a wavelength band within a range between approximately 1.55 µm and approximately 1.65 µm; and
  a wavelength band within a range between approximately 2.15 µm and approximately 2.3 µm.

* * * * *